United States Patent [19]

White

[11] Patent Number: 4,503,167

[45] Date of Patent: Mar. 5, 1985

[54] METHOD FOR URETHANE-MODIFIED ISOCYANURATE FOAMS

[75] Inventor: Kenneth B. White, Lisle, Ill.

[73] Assignee: Akzona Incorporated, Enka, N.C.

[21] Appl. No.: 592,304

[22] Filed: Mar. 21, 1984

Related U.S. Application Data

[63] Continuation-in-part of Ser. No. 519,576, Aug. 2, 1983, abandoned.

[51] Int. Cl.³ ............ C08G 18/14; C08G 18/16; C08G 18/34
[52] U.S. Cl. .................... 521/105; 521/167; 521/902
[58] Field of Search ............ 521/105, 167, 902

[56] References Cited

U.S. PATENT DOCUMENTS

| | | | |
|---|---|---|---|
| 3,635,848 | 1/1972 | Rambosek | 521/99 |
| 3,697,485 | 10/1972 | Rambosek et al. | 521/105 |
| 3,853,818 | 12/1974 | Rambosek et al. | 521/105 |
| 3,880,782 | 4/1975 | Rambosek | 521/105 |
| 4,151,334 | 4/1979 | Kan et al. | 521/105 |
| 4,425,444 | 1/1984 | White | 521/105 |

*Primary Examiner*—Herbert S. Cockeram
*Attorney, Agent, or Firm*—Francis W. Young; Louis A. Morris

[57] ABSTRACT

A method for the manufacture of urethane-modified polyisocyanurate foams in which an isocyanate is blended with a "B" side comprising a polyol blend, a surfactant, a blowing agent, and optionally, a catalyst. The polyol blend comprises at least 5% (wt.) of a mixture of a polyalkoxylated amine and a polyalkoxylated quaternary ammonium borate ester, at least 45% (wt.) of a resin polyol, with any remainder being a polyether or polyester polyol. All components of the "B" side will remain a homogeneous liquid without phase separation and without the need for agitation for at least 3 days and 7 days after blending.

29 Claims, No Drawings

METHOD FOR URETHANE-MODIFIED ISOCYANURATE FOAMS

RELATED APPLICATIONS

This is a continuation in part of Ser. No. 519,576, filed Aug. 2, 1983, now abandoned.

BACKGROUND OF THE INVENTION

This invention pertains to the formation of urethane-modified isocyanurate foams using mixtures of polyalkoxylated amines and polyalkoxylated quaternary ammonium borate esters as copolymols. More particularly this invention relates to the use of such copolymols to form foams having NCO/OH ratios of 1.5 to 3.5, using inexpensive, commercially available resin polyols. A blend of these polyalkoxylated amines and polyalkoxylated quaternary ammonium borate esters with the aforesaid resin polyol and, optionally, a polyether or polyester polyol is very stable and will remain a homogeneous liquid without phase separation and without the need for agitation for at least 3 days after blending.

Urethane and polyisocyanurate foams are manufactured using a blend of an isocyanate and a polyol. The molar ratio of isocyanate to polyol, that is, the ratio of NCO functional groups to OH functional groups, is known as the "index" or "NCO/OH ratio". Foams are manufactured with both isocyanates and polyols and when the molar ratio of isocyanate to polyol is between 1.05 to 1.15, a urethane foam is formed according to the reaction:

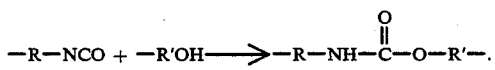

The urethane moiety shown above is the repeating unit characteristic of polyurethanes, including foams. At an index between 1.5 and 3.5, a urethane-modified isocyanurate foam is formed. At indices above 4.0, an isocyanurate foam is formed having the repeating unit:

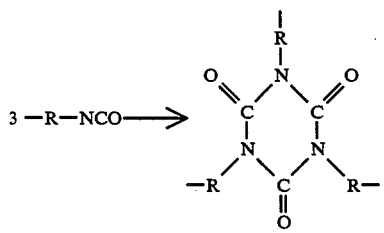

which may have a minority of urethane linkages. Herein, the terms isocyanurate and polyisocyanurate and the terms urethane and polyurethane in reference to foams will be used interchangably.

Currently, urethane-modified polyisocyanurate foams are manufactured using polyether or polyester polyols, as for example the Voranol ® group of polyols available from Dow Chemical Company, Midland, Mich. When combined with a catalyst, a surfactant, and a blowing agent, and then with an isocyanate in the known manner, these polyether or polyester polyols form a foam having good qualities. Certain resin polyols, such as the Polyol D400 resin polyol available from Dixie Chemical Company, 10701 Bay Area Boulevard, Pasadena, Tex., and the Foamol 250 resin polyol available from Jim Walter Research Corporation, 10301 9th St. North, St. Petersburg, Fla., are of a hydroxyl number sufficient so as to theoretically permit their use in foam manufacture. In practice, however, these polyols have proved to be unacceptable at concentrations in excess of 40% (wt.) of the total polyol blend for use in manufacturing high quality urethane-modified polyisocyanurate foams. Because the resin polyols are about one-third less costly than the currently used conventional polyether or polyester polyols, it is desirable that a polyol blend be found that may be used with larger quantities of such resin polyols to result in a urethane-modified polyisocyanurate foam having acceptable properties and at a lower cost.

U.S. patent application Ser. No. 476,184, filed Mar. 17, 1983, now U.S. Pat. No. 4,425,444 by the same inventor as the present invention, discloses the presently used polyol blend with other resin polyols in the manufacture of urethane-modified polyisocyanurate foams.

SUMMARY OF THE INVENTION

The present invention is a method for the manufacture of urethane-modified polyisocyanurate foams, comprising blending on isocyanate with a "B" side, the "B" side comprising a polyol blend, a surfactant, a blowing agent, and, optionally, a catalyst. The polyol blend comprises: at least 5% (wt.) of a mixture of a polyalkoxylated amine and a polyalkoxylated quaternary ammonium borate ester, the weight ratio of the polyalkoxylated amine to the polyalkoxylated quaternary ammonium borate ester being from 1:0.005 to 1:12, preferably from 1:0.1 to 1:4, at least 45% (wt.) of a resin polyol having the general formula:

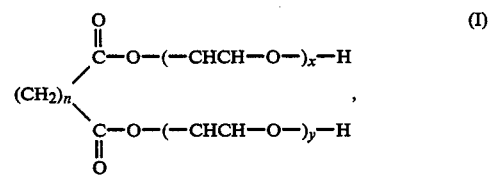

wherein n is an integer between 1 and 4 inclusive and x and y are integers each having a value of between 2 and 20, inclusive; and the remainder of the polyol blend being a polyether or polyester polyol. All of the components of the "B" side may be blended and will thereafter remain a homogeneous liquid without phase separation and without the need for agitation for at least three days and, usually, for at least seven days.

In another embodiment of the invention, the resin polyol has the following structure:

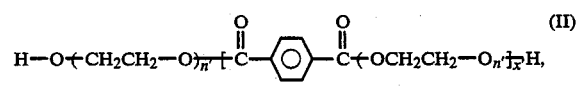

wherein n' is either 1 or 2 and x' is an integer between 1 and 20, inclusive.

In another embodiment of the invention, the polyalkoxylated amine has the formula:

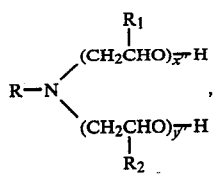

wherein R is selected from the group of alkyl radicals having between 1 and 18 carbon atoms, $x''$ and $y''$ are integers each having a value of at least one and wherein the sum of $x''$ and $y''$ does not exceed 50 and wherein $R_1$ and $R_2$ may be the same or different and may be selected from the groups consisting of H—, $CH_3$—, $C_1$-$C_{10}$ straight- or branched-chain alkyl or alkenyl radicals, a phenyl group, a benzyl group or halogenated alkyl group. In a most preferred polyalkoxylated amine, R corresponds to the tallow alkyl group, $R_1$ and $R_2$ are each H—, and $x''$ plus $y''$ equal 5. Hence, the preferred polyalkoxylated amine is a tallow penta-ethyoxylated amine.

In a still further embodiment of the invention, the polyalkoxylated quaternary ammonium borate esters are of the general formula:

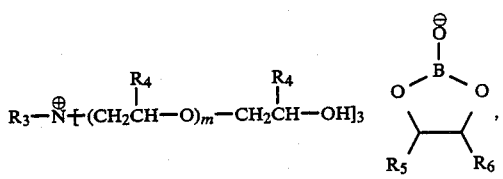

wherein $R_3$ is a straight- or branched-chain alkyl or alkenyl radical having from 1 to 30 carbon atoms, inclusive, or a phenyl or benzyl radical; $R_4$ is H—, a $C_1$ to $C_{10}$ straight- or branched-chain alkyl or alkenyl radical, a phenyl group, a benzyl group, or a halogenated alkyl group; $R_5$ and $R_6$ are different or the same and are selected from the group including H—, or a $C_1$ to $C_{10}$ straight- or branched-chain alkyl or alkenyl radical, a phenyl group, or a benzyl group; and wherein m is an integer between 0 to 30, inclusive. Preferably, the polyalkoxylated quaternary ammonium borate ester will include an $R_3$ that is a straight- or branched-chain alkyl or alkenyl radical having from 8 to 18 carbon atoms, and $R_4$, $R_5$, $R_6$ will be H—. The borate ester anion may alternatively include a $CH_3$— at the $R_6$ position. A most preferred quaternary ammonium borate ester has an m equal to 0 and an $R_3$ corresponding to the tallowalkyl ($C_{18}H_{37}$) radical.

In yet another embodiment of the present invention, the polyalkoxylated amine has the formula:

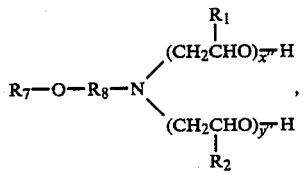

wherein $R_7$ is selected from the group of $C_1$-$C_{20}$ alkyl groups and $R_8$ is a $C_2$ to $C_5$ alkyl group; $R_1$ and $R_2$ are the same or different and may be selected from the groups consisting of H—, $CH_3$—, $C_1$ to $C_{10}$ straight- or branched-chain alkyl or alkenyl radicals, a phenyl group, a benzyl group, or a halogenated alkyl group; and $x''$ and $y''$ are integers each having a value of at least 1 and having a sum not exceeding 50.

An object of the present invention is a method for the manufacture of urethane-modified polyisocyanurate foams in which the polyol blend, surfactant, blowing agent, and catalyst remain a homogeneous liquid without phase separation and without the need for agitation for at least three days and, usually for at least seven days. A further object of the invention is a method for the manufacture of urethane-modified polyisocyanurate foams in which at least 45% and preferably up to 80% by weight of the polyol blend comprises a resin polyol so as to reduce the cost of manufacturing those foams by decreasing the amount of relatively costly conventional polyether or polyester polyol used in the polyol blend.

DESCRIPTION OF THE PREFERRED EMBODIMENTS

The isocyanates may be selected from the groups including the organic polyisocyanates which are disclosed herein as useful in the production of conventionally manufactured urethane-modified polyisocyanurate foams. A preferred polyisocyanate is Mondur ®MR, a polycyclic aromatic polyisocyanate available from the Mobay Chemical Corporation, Pittsburgh, Pa.

Present urethane-modified polyisocyanurate foams may be manufactured according to methods known in the art. These methods comprise blending two components, stirring, and allowing the blend to rise in an open container so as to form the desired foam. The two components are known as the "A" and "B" components or "sides", with the "A" component comprising the isocyanate and the "B" component comprising a blend of polyol, catalyst, if used, surfactant, and blowing agent. A catalyst may be used, but is not essential.

Catalysts, if used, may be selected from those conventionally used in the art, including metal salts, alkali metal salts, and tertiary amine trimerization catalysts. A preferred catalyst is potassium octanoate or potassium 2-ethylhexanoate. The present preferred catalyst is M & T-T45 catalyst, which is 45% active potassium 2-ethylhexanoate and 55% polyethylene glycol having a molecular weight of 200, and which is available from M & T Chemicals Inc., Rahway, N.J., 07065. The amount of catalyst to be used will range up to 20% of the total polyol blend weight. The blowing agent may be selected from the group including water, methylene chloride, or any of the fluorocarbons known to those skilled in the art which can be used for blowing polymer mixtures into cellular polymers. Generally speaking, such fluorocarbon blowing agents are fluorinated aliphatic hydrocarbons which may also be substituted by chlorine and/or bromine. A most preferred blowing agent is Freon ®11A, a trifluorochloromethane produced by E. I. DuPont de Nemours & Company, Wilmington, Del. Surfactants may likewise be chosen from among those known to the skilled in the art; a preferred surfactant is DC-193, a surfactant having silicon glycol copolymers with a direct silicon-carbon bonds, and sold by the Dow Corning Corporation, Midland, Mich.

The present polyol blends may be obtained by mixing in a container the polyalkoxylated amine, polyalkoxylated quaternary ammonium borate ester, resin polyol, and optionally, the polyether or polyester polyol. The polyalkoxylated amines may include polyethoxylated or polypropoxylated amines, wherein the amines are tertiary amines having one fatty alkyl group derived from various fatty sources and two or more polyoxyethylene or polyoxypropylene groups attached to the nitrogen. Typical of these polyethoxylated or polypropoxylated amines are the Ethomeen® polyethoxylated amines available from the Armak Company, 300 S. Wacker Drive, Chicago, Ill., 60606, preferably being of the general formula:

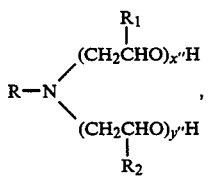

wherein R is selected from the group of alkyl radicals having between 1 and 18 carbon atoms, $x''$ and $y''$ are integers each having a value of one or more, the sum of $x''$ and $y''$ not exceeding 50; and wherein $R_1$ and $R_2$ may be the same or different, and may be selected from the groups consisting of H—, $CH_3$—, $C_1$-$C_{10}$ straight- or branched-chain akyl or alkenyl radicals, a phenyl group, a benzyl group or halogenated alkyl group. Another preferred polyalkoxylated amine includes the compound Ethomeen®EA-80 polyethoxylated ether amine, which is manufactured by the combination of a $C_8$ and $C_{10}$ branched-chain alcohol and which is also available from the Armak Company, Chicago, Ill. These preferred ether amines are selected from the group consisting of:

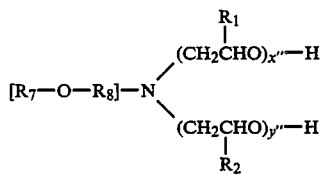

wherein $R_7$ is selected from the group of $C_1$-$C_{20}$ alkyl groups, and $R_8$ is a $C_2$ to $C_5$ alkyl group; $R_1$ and $R_2$ are the same or different and may be selected from the groups consisting of H—, $CH_3$—, $C_1$ to $C_{10}$ straight- or branched-chain alkyl or alkenyl radicals, a phenyl group, a benzyl group, or a halogenated alkyl group; and $x''$ and $y''$ are integers each having a value of at least 1 and having a sum not exceeding 50.

Also required for the polyol blend are polyalkoxylated quaternary ammonium borate esters. These compounds are of the general formula:

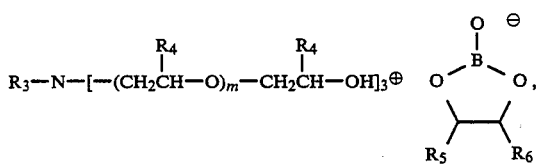

wherein $R_3$ is a straight- or branched-chain alkyl or alkenyl radical having from 1 to 30 carbon atoms, inclusive, or a phenyl or benzyl radical; $R_4$ is H—, a $C_1$ to $C_{10}$ straight- or branched-chain alkyl or alkenyl radical, a phenyl group, a benzyl group, or a halogenated alkyl group; $R_5$ and $R_6$ are different or the same and are selected from the group including H—, or a $C_1$ to $C_{10}$ straight- or branched-chain alkyl or alkenyl radical, a phenyl group, or a benzyl group, and wherein m is an integer between 0 and 30, inclusive. The cationic portion of the polyalkoxylated quaternary ammonium borate ester may also be selected from the group described by the general formula:

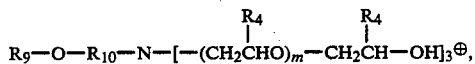

wherein m and $R_4$ are as defined hereinabove, $R_9$ is a $C_1$-$C_{20}$ alkyl or alkoxy group, and $R_{10}$ is a $C_2$ to $C_5$ alkyl group. Preferably, $R_{10}$ is —$C_3H_6$— and $R_9$ is a combination of approximately equal amounts of $C_{12}$-$C_{15}$ alkyl groups. In this specification, the cationic portion of the polyalkoxylated quaternary ammonium borate esters may be selected from either of the immediately preceding two general formulae. The preferred weight ratio of the polyalkoxylated amine to the polyalkoxylated quaternary ammonium borate ester is between 1:0.1 and 1:4.

At least 45% by weight of the polyol blend will comprise one of the resin polyols corresponding to either formula (I) or formula (II) above. Examples of the above resin polyols include the D-400 Polyol and the Foamol 250 polyol mentioned hereinabove. The D-400 and the Foamol 250 resin polyols are dark colored, highly polar liquids that are insoluble in aliphatic hydrocarbon solvents and water.

The remainder of the polyol blend will comprise a conventional polyether or polyester polyol. These polyether or polyester polyols are well known in the art of polyurethane and polyisocyanurate foam manufacture, as for example the Voranol® polyether polyols manufactured by the Dow Chemical Company, Midland, Mich. A most preferred polyether or polyester polyol is Voranol®575.

The particular polyol blend in accordance with this invention is advantageous in that all of the components of the "B" side may be blended together with a polyol blend and the "B" side will thereafter remain a homogeneous liquid without phase separation and without the need for agitation for at least 3 days, and usually for at least 7 days, and may still be used to manufacture a foam having excellent physical properties.

There are several criteria to be noted in determining whether a foam is of an acceptable quality. Of lesser importance is the tack free time, which is preferably about 60 seconds or less. Dimensional stability is more important, and the foam should not exceed 115% of its original dimensions after seven days. Dimensional stability is tested at two conditions: 158° F. and 100% relative humidity; and 200° F. and ambient humidity. Another important criterion is the percentage of closed cells in the foam itself, with a minimum of 85% required. Finally, a percent friability, the loss of weight of the polyisocyanurate foam due to crumbling, is determined by the ASTM C421 test. The friability of a foam is good if under 20% and excellent if under 10%.

The following examples will demonstrate the use of the present polyol blend in the manufacture of polyisocyanurate foams using low cost resin polyols. The first examples pertain to the manufacture of the particular mixture of a polyalkoxylated amine and a polyalkoxylated quaternary ammonium borate ester. These mixtures are used in this invention in an amount comprising at least 5% (wt.) of the polyol blend.

EXAMPLE 1

304 grams of 1,2-propanediol (4.0 gram moles) are added to 124 grams of boric acid (2.0 gram moles) in a one-liter, three neck flask equipped with a heating mantle, a Dean-Stark trap, and a condenser. The mixture is heated to 128° C. at atmospheric pressure, and retained at that temperature and pressure for about 3½ hours, during which time about 44.5 grams of water was stripped from the mixture. A water aspirator is then started to create a slight vacuum at the condenser, and another 65.0 grams of water is stripped from the mixture during the next 5¾ hours. The total water removed (109.5 grams) corresponds to the stoichiometric amount, but analysis of the borate ester adduct remaining in the flask showed that it contained 3.4% water.

A 100 gallon Monel reactor was charged with 186 lbs. (0.71 lb. mole) of Armeen ®TM 97 aliphatic amine and 30.0 lbs. of diethylene glycol, and the mixture was heated to 65° C. Over a two hour period, 85 lbs. (0.53 lb. mole) of the bis-propylene glycol borate ester described in the first paragraph of this example was pumped into the reactor, causing the temperature to rise to 80° C. After cooling to 75° C., 133 lbs. (3.02 lb. mole) of ethylene oxide was added over a period of two hours and 42 minutes. During this time the total reactor pressure was not allowed to exceed 50 psig and the temperature was maintained at 95° C. The mixture was allowed to digest for another 2 hours and 40 minutes, whereupon analysis showed 1.317 meq/g of quat and 0.307 meq/g of free amine and 0.3% $H_2O$. The reactor was purged with a stream of nitrogen at 75°–85° C. and 0 psig pressure for 4 hours and an additional 6 hours at 100° C. Analysis showed 0.11% $H_2O$. This is Armol ®101B-1.

27.9 lbs. of the 101B-1 and 107.1 lbs. Ethomeen ®T/15 were mixed in a 30 gallon Pfaudler reactor at 70° C. Water was removed from the blend by sparging with a stream of nitrogen at 70° C. at 27″ Hg vacuum over a 5½ hour period. Analysis after this time showed; quat 0.238 meq/g, free amines 1.779 meq/g, pH (10% in $H_2O$) 10.9, $H_2O$<0.1% and OH value 318. This product corresponds to Armol TM 201B-125 amine/ammonium borate ester blend.

EXAMPLE 2

39.0 lbs. of Armol TM 101B-1 amine/ammonium borate ester blend and 96.0 lbs. of Ethomeen ®T/15 ethoxylated amine was blended at 70° C. in a 30 gallon Pfaudler reactor. Water was removed by sparging with a stream of nitrogen at 70° C. 27″ Hg vacuum over 5 hours. Analysis showed; quat 0.331 meq/g, free amine 1.650 meq/g, pH (10% in water) 10.9, $H_2O$<0.1%, OH value 332. This product corresponds to Armol TM 201B-135 amine/ammonium borate ester blend.

The ratios of free amine to quaternary in the presently used amine/quaternary ammonium borate ester blend are as follows:

| Amine/quaternary ammonium borate ester blend | Ratio, free amines: quat |
|---|---|
| Armol TM 101B-1 | 1:4.06 |
| Armol TM 201B-125 | 1:0.137 |
| 201B-135 | 1:0.234 |

EXAMPLE 3

A urethane-modified polyisocyanurate foam with an index of 3.0 was manufactured by blending 302 grams of Mondur MR with a "B" side comprising 17.5 grams of Armol TM 201B-135, 67.5 grams Foamol 250, 15.0 grams Voranol ®575, 2.5 grams Dow Corning DC-193, and 61.0 grams Freon ®11A. The resulting foam had a cream time of 24 seconds, a gel time of 41 seconds, a tack free time of 85 seconds, a density of 1.84 lbs. per cubic foot, a 3.2% friability, 92.8% closed cells, was at 105.75% of its original dimensions after seven days at 158° F. and 100% relative humidity, and was at 104.96% of its original dimensions after seven days at 200° F. and the ambient relative humidity.

EXAMPLES 4–8

Urethane-modified polyisocyanurate foams were manufactured in substantially the same manner set forth in Example 3, but at different indexes and frequently using Armol TM 201B-125 instead of Armol TM 201B-135. The reaction profiles, densities, percent closed cells, and percent friabilities are shown in Table 1.

EXAMPLE 9–12

Urethane-modified polyisocyanurate foams were prepared in substantially the same manner set forth in Examples 3–8 but using the aforementioned D-400 resin polyol instead of Foamol 250. The particular amine/quaternary ammonium borate ester blend used and the reaction profiles and physical properties of the foams manufactured are disclosed in Table 2 below.

EXAMPLES 13–15

Urethane-modified polyisocyanurate foams were prepared in substantially the same manner set forth in Examples 3–8. The particular amine/quaternary ammonium borate ester blend used and the reaction profiles of the foams manufactured are disclosed in Table 3 below. The blends remained in a stable and homogeneous form for three days without agitation.

EXAMPLE 16

A urethane-modified polyisocyanurate foam with an index of 3.0, having a fast reaction profile, may also be prepared, using Armol TM 101B-1 prepared in Example 1 by blending 332.9 grams Mondur ®MR as the "A" side with a "B" side comprising:

| | |
|---|---|
| Armol 101B-1 | 15.0 |
| Foamol 250 | 67.5 |
| Voranol 575 | 17.5 |
| DC-193 | 2.5 |
| T-45 | 0.2 |
| Freon 11A | 65.6 |

TABLE 1

| | Example 4 | Example 5 | Example 6 | Example 7 | Example 8 |
|---|---|---|---|---|---|
| Armol 201B-135 | — | — | — | — | 17.5 |
| Armol 201B-125 | 17.5 | 20.0 | 20.0 | 17.5 | — |

TABLE 1-continued

|  |  | Example 4 | Example 5 | Example 6 | Example 7 | Example 8 |
|---|---|---|---|---|---|---|
| Foamol 250 |  | 67.5 | 80.0 | 80.0 | 67.5 | 67.5 |
| Voranol 575 |  | 15 | — | — | 15.0 | 15.0 |
| DC-193 |  | 2.5 | 2.5 | 2.5 | 2.5 | 2.5 |
| T-45 |  | 2.0 | 0.7 | 0.5 | 0.6 | 0.9 |
| Freon 11A |  | 68.5 | 63.5 | 56.5 | 61.0 | 68.5 |
| Mondur MR |  | 350.2 | 318.9 | 273.3 | 300.2 | 352.3 |
| NCO/OH Ratio |  | 3.5 | 3.5 | 3.0 | 3.0 | 3.5 |
| Reaction Profile (Min:Sec) |  |  |  |  |  |  |
| Cream Time |  | 0:20 | 0:15 | 0:15 | 0:29 | 0:23 |
| Gel Time |  | 0:36 | 0:31 | 0:29 | 0:51 | 0:43 |
| Tack Free Time |  | 1:08 | 2:15 | 1:10 | 1:38 | 2:00 |
| Density (PCF) |  | 1.82 | 1.85 | 1.85 | 1.76 | 1.79 |
| Humid Aging, 158° F./100% RH, | 1 day | 3.79 | 7.42 | 6.39 | 5.83 | 3.57 |
| % change in volume | 7 days | 6.77 | 8.86 | 8.00 | 7.38 | 4.82 |
| Dry Aging, 200° F./ambient RH, | 1 day | 2.98 | 2.36 | 2.05 | 1.37 | 3.13 |
| % change in volume | 7 days | 4.75 | 3.28 | 3.04 | 3.51 | 4.23 |
| % Closed Cells |  | 87.3 | 91.7 | 92.3 | 85.0 | 90.1 |
| % Friability |  | 25.5 | 2.6 | 3.2 | 13.3 | 18.9 |

TABLE 2

|  |  | Example 9 | Example 10 | Example 11 | Example 12 |
|---|---|---|---|---|---|
| Armol 201B-125 |  | 17.5 | — | — | 17.5 |
| Armol 201B-135 |  | — | 17.5 | 17.5 | — |
| D-400 resin polyol |  | 67.5 | 67.5 | 67.5 | 67.5 |
| Voranol 575 |  | 15.0 | 15.0 | 15.0 | 15.0 |
| DC-193 |  | 2.5 | 2.5 | 2.5 | 2.5 |
| T-45 |  | 0.7 | 0.7 | 0.9 | 1.5 |
| Freon 11A |  | 51.5 | 51.5 | 57.5 | 57.5 |
| Mondur MR |  | 237.1 | 238.9 | 278.7 | 276.6 |
| NCO/OH Ratio |  | 3.0 | 3.0 | 3.5 | 3.5 |
| Reaction Profile (Min:Sec) |  |  |  |  |  |
| Cream Time |  | 0:15 | 0:15 | 0:25 | 0:26 |
| Gel Time |  | 0:29 | 0:29 | 0:43 | 0:54 |
| Tack Free Time |  | 0:38 | 0:35 | 1:15 | 2:30 |
| Density (PCF) |  | 1.81 | 1.96 | 2.05 | 1.83 |
| Humid Aging, 158° F./100% RH, | 1 day | 5.23 | 5.11 | 6.85 | 5.50 |
| % change in volume | 7 days | 6.52 | 6.24 | 8.94 | 5.92 |
| Dry Aging, 200° F./ambient RH, | 1 day | 3.09 | 5.07 | 3.61 | 2.01 |
| % change in volume | 7 days | 5.33 | 6.72 | 5.29 | 4.44 |
| % Closed Cells |  | 86.2 | 86.76 | 90.6 | 84.5 |
| % Friability |  | 9.4 | 6.5 | 3.5 | 19.1 |

TABLE 3

|  | Example 13 | Example 14 | Example 15 |
|---|---|---|---|
| Armol 201B-105 |  |  |  |
| Amount | 20.0 | — | — |
| meq/g free amine | 2.06 | — | — |
| meq/g quaternary | 0.01 | — | — |
| Ratio free amines: quat: | 1:0.005 | — | — |
| Armol 201B-135 | — | 20.0 | — |
| Armol 201B-125 | — | — | 20.0 |
| Foamal 250 resin polyol | 67.5 | 67.5 | 67.5 |
| Voranol 575 | 12.5 | 12.5 | 12.5 |
| DC-193 | 2.5 | 2.5 | 2.5 |
| T-45 | 0.5 | — | — |
| Freon 11A | 44.1 | 44.6 | 44.7 |
| Mondur MR | 189.8 | 193.7 | 194.1 |
| NCO/OH Ratio | 2.0 | 2.0 | 2.0 |
| Reaction Profile (Min:Sec) |  |  |  |
| Cream Time | 0:32 | 0:23 | 0:30 |
| Gel Time | 1:20 | 0:33 | 0:48 |
| Tack Free Time | 2:00 | 0:38 | 1:00 |

What is claimed is:

1. A method for the manufacture of urethane-modified polyisocyanurate foams, comprising blending and reacting an isocyanate with a "B" side, said "B" side comprising a polyol blend, a surfactant, and a blowing agent, said polyol blend comprising:
   (a) at least 5% (wt.) of a mixture of a polyalkoxylated amine and a polyalkoxylated quaternary ammonium borate ester, the weight ratio of said polyalkoxylated amine to said polyalkoxylated quaternary ammonium borate ester being from 1:0.005 and 1:12;
   (b) at least 45% (wt.) of a resin polyol, said resin polyol comprising

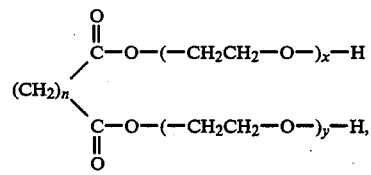

wherein n is an integer between 1 and 4 inclusive and x and y are integers each having a value of between 2 and 20, inclusive; and
   (c) the remainder of said polyol blend being a polyether or polyester polyol.

2. The method of claim 1, wherein said weight ratio of said amine to said ester is from 1:0.1 to 1:4.

3. The method of claim 1, wherein said weight ratio of said amine to said ester is from 1:0.15 to 1:4.

4. The method as set forth in claim 1, wherein said polyalkoxylated amine is of the general formula

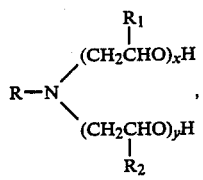

wherein R is selected from the group of alkyl radicals having between 1 and 18 carbon atoms, x and y are integers each having a value of at least one and wherein the sum of x and y does not exceed 50 and wherein $R_1$ and $R_2$ may be the same or different and may be selected from the groups consisting of H—, $CH_3$—, $C_1$–$C_{10}$ straight- or branched-chain alkyl or alkenyl radicals, a phenyl group, a benzyl group or halogenated alkyl group.

5. The method as set forth in claim 4, wherein R is the tallow alkyl group, $R_1$ and $R_2$ are each H—, and wherein x plus y equal 5.

6. The method as set forth in claim 1, wherein said polyalkoxylated quaternary ammonium borate ester is of the general formula:

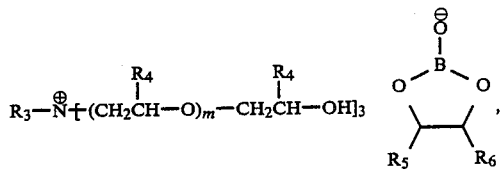

wherein $R_3$ is a straight- or branched-chain alkyl or alkenyl radical having from 1 to 30 carbon atoms, inclusive, or a phenyl or benzyl radical; $R_4$ is H—, a $C_1$ to $C_{10}$ straight- or branched-chain alkyl or alkenyl radical, a phenyl group, a benzyl group, or a halogenated alkyl group; $R_5$ and $R_6$ are different or the same and are selected from the group including H—, or a $C_1$ to $C_{10}$ straight- or branched-chain alkyl or alkenyl radical, a phenyl group, or a benzyl group, and wherein m is an integer between 0 to 30, inclusive.

7. The method as set forth in claim 6, wherein $R_3$ is a straight- or branched-chain alkyl or alkenyl radical having from 8 to 18 carbon atoms, and $R_4$ is H—.

8. The method as set forth in claim 6, wherein $R_5$ and $R_6$ are H—.

9. The method as set forth in claim 6, wherein $R_5$ is H— and $R_6$ is $CH_3$—.

10. The method as set forth in claim 8, wherein m is 0.

11. The method as set forth in claim 9, wherein m is 0.

12. The method as set forth in claim 8, wherein $R_3$ is $C_{18}H_{37}$—.

13. The method as set forth in claim 1, wherein said polyalkoxylated amine is of the general formula

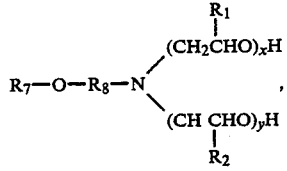

wherein $R_7$ is selected from the group of $C_1$–$C_{20}$ alkyl groups and $R_8$ is a $C_2$ or $C_3$ alkyl group; $R_1$ and $R_2$ are the same or different and may be selected from the groups consisting of H—, $CH_3$—, $C_1$ to $C_{10}$ straight- or branched-chain alkyl or alkenyl radicals, a phenyl group, a benzyl group, or a halogenated alkyl group; and x and y are integers each having a value of at least 1 and a sum not exceeding 50.

14. The method as set forth in claim 1, wherein said polyalkoxylated quaternary ammonium borate ester is of the general formula:

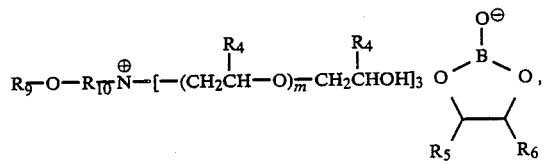

wherein $R_4$ is H—, a $C_1$ to $C_{10}$ straight- or branched-chain alkyl or alkenyl radical, a phenyl group, a benzyl group, or a halogenated alkyl group; $R_5$ and $R_6$ are different or the same and are selected from the group including H—, or a $C_1$ to $C_{10}$ straight- or branched-chain alkyl or alkenyl radical, a phenyl group, or a benzyl group, m is an integer between 0 and 30, inclusive, $R_9$ is a $C_1$–$C_{20}$ alkyl group, and $R_{10}$ is a $C_2$ or $C_3$ alkyl group.

15. A method for the manufacture of urethane-modified polyisocyanurate foams, comprising blending and reacting an isocyanate with a "B" side, said "B" side comprising a polyol blend, a surfactant, and a blowing agent, said polyol blend comprising:

(a) at least 5% (wt.) of a mixture of a polyalkoxylated amine and a polyalkoxylated quaternary ammonium borate ester, the weight ratio of said polyalkoxylated amine to said polyalkoxylated quaternary ammonium borate ester being between 1:0.005 and 1:12

(b) at least 45% (wt.) of a resin polyol, said resin polyol comprising

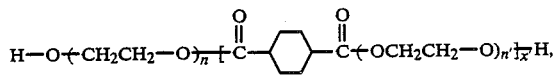

wherein n' is either 1 or 2 and x' is an integer between 1 and 20, inclusive; and (c) the remainder of said polyol blend being a polyether or polyester polyol.

16. The method as set forth in claim 15, wherein said polyalkoxylated amine is of the general formula

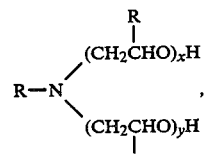

wherein R is selected from the group of alkyl radicals having between 1 and 18 carbon atoms, x and y are integers each having a value of at least one and wherein the sum of x and y does not exceed 50 and wherein $R_1$ and $R_2$ may be the same or different and may be selected from the groups consisting of H—, $CH_3$—, $C_1$–$C_{10}$ straight- or branched-chain alkyl or alkenyl radicals, a phenyl group, a benzyl group or halogenated alkyl group.

17. The method as set forth in claim 16, wherein R is the tallow alkyl group, $R_1$ and $R_2$ are each H—, and wherein x plus y equal 5.

18. The method as set forth in claim 15, wherein said polyalkoxylated quaternary ammonium borate ester is of the general formula:

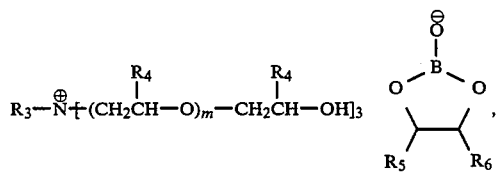

wherein $R_3$ is a straight- or branched-chain alkyl or alkenyl radical having from 1 to 30 carbon atoms, inclusive, or a phenyl or benzyl radical; $R_4$ is H—, a $C_1$ to $C_{10}$ straight- or branched-chain alkyl or alkenyl radical, a phenyl group, a benzyl group, or a halogenated alkyl group; $R_5$ and $R_6$ are different or the same and are selected from the group including H—, or a $C_1$ to $C_{10}$ straight- or branched-chain alkyl or alkenyl radical, a phenyl group, or a benzyl group, and wherein m is an integer between 0 to 30, inclusive.

19. The method of claim 15, wherein said weight ratio of amine to quaternary ester is from 1:0.1 to 1:12.

20. The method as set forth in claim 19, wherein $R_3$ is a straight- or branched-chain alkyl or alkenyl radical having from 8 to 18 carbon atoms, and $R_4$ is H—.

21. The method as set forth in claim 19, wherein $R_5$ and $R_6$ are H—.

22. The method as set forth in claim 19, wherein $R_5$ is H— and $R_6$ is $CH_3$—.

23. The method as set forth in claim 21, wherein m is 0.

24. The method as set forth in claim 22, wherein m is 0.

25. The method as set forth in claim 23, wherein $R_3$ is $C_{18}H_{37}$—.

26. The method as set forth in claim 15, wherein said polyalkoxylated amine is of the general formula

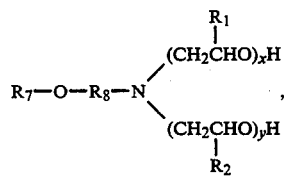

wherein $R_7$ is selected from the group of $C_1$–$C_{20}$ alkyl groups and $R_8$ is a $C_2$ or $C_3$ alkyl group; $R_1$ and $R_2$ are the same or different and may be selected from the groups consisting of H—, $CH_3$—, $C_1$ to $C_{10}$ straight- or branched-chain alkyl or alkenyl radicals, a phenyl group, a benzyl group, or a halogenated alkyl group; and x and y are integers each having a value of at least 1 and a sum not exceeding 50.

27. The method as set forth in claim 15, wherein said polyalkoxylated quaternary ammonium borate ester is of the general formula:

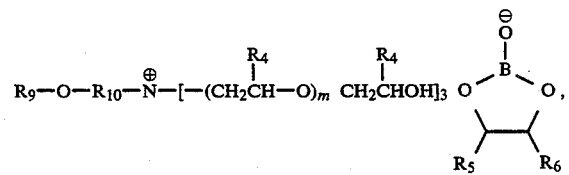

wherein $R_4$ is H—, a $C_1$ to $C_{10}$ straight- or branched-chain alkyl or alkenyl radical, a phenyl group, a benzyl group, or a halogenated alkyl group; $R_5$ and $R_6$ are different or the same and are selected from the group including H—, or a $C_1$ to $C_{10}$ straight- or branched-chain alkyl or alkenyl radical, a phenyl group, or a benzyl group, m is an integer between 0 and 30, inclusive, $R_9$ is a $C_1$–$C_{20}$ alkyl group, and $R_{10}$ is a $C_2$ or $C_3$ alkyl group.

28. The method of claim 1, wherein said "B" side additionally comprises a catalyst.

29. The method of claim 15, wherein said "B" side additionally comprises a catalyst.

* * * * *